US007668721B2

(12) United States Patent
Barkley et al.

(10) Patent No.: US 7,668,721 B2
(45) Date of Patent: Feb. 23, 2010

(54) INDEXING AND STRONG VERBAL CONTENT

(75) Inventors: Warren V Barkley, Mill Creek, WA (US); Andrew P Sinclair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 11/419,678

(22) Filed: May 22, 2006

(65) Prior Publication Data

US 2007/0271090 A1 Nov. 22, 2007

(51) Int. Cl.
   G10L 15/00 (2006.01)
(52) U.S. Cl. .................. 704/275; 704/235; 704/270; 707/3; 707/5
(58) Field of Classification Search .......... 704/235, 704/270, 275; 707/3, 5
   See application file for complete search history.

(56) References Cited

U.S. PATENT DOCUMENTS

| 5,606,643 | A | | 2/1997 | Balasubramanian et al. |
| 5,649,060 | A | * | 7/1997 | Ellozy et al. ............ 704/278 |
| 5,710,591 | A | | 1/1998 | Bruno et al. |
| 5,835,667 | A | | 11/1998 | Wactlar et al. |
| 6,185,527 | B1 | | 2/2001 | Petkovic et al. |
| 6,603,921 | B1 | | 8/2003 | Kanevsky et al. |
| 6,728,673 | B2 | | 4/2004 | Furuyama et al. |
| 6,754,619 | B1 | | 6/2004 | Nakatsuyama |
| 6,907,397 | B2 | | 6/2005 | Kryze et al. |
| 7,039,585 | B2 | * | 5/2006 | Wilmot et al. ............ 704/235 |
| 7,212,972 | B2 | * | 5/2007 | Sugano et al. ............ 704/500 |
| 7,272,558 | B1 | * | 9/2007 | Soucy et al. ............. 704/235 |
| 7,295,752 | B1 | * | 11/2007 | Jain et al. ............... 386/46 |
| 7,490,092 | B2 | * | 2/2009 | Sibley et al. ............ 707/100 |
| 2002/0062210 | A1 | | 5/2002 | Hamada |
| 2003/0171926 | A1 | | 9/2003 | Suresh et al. |

OTHER PUBLICATIONS de Jong, et al., "Olive: Speech Based Video Retrieval", from the Internet: http://scholar.google.com/url?sa=U&q=http://twentyone.tpd.tno.nl/olive/public/publications/cbmi99-final.ps. Oct. 1999.

Iyengar, et al, "Semantic Indexing of Multimedia Using Audio, Text and Visual Cues", IBN TH Watson Research Center, from the Internet: http://scholar.google.com/url?sa=U&q=http://www.ifp.uiuc.edu/~milind/papers/conferences/multijects.ps.gz. Nov. 16, 2002.

(Continued)

*Primary Examiner*—Daniel D Abebe
(74) *Attorney, Agent, or Firm*—Lee & Hayes, PLLC

(57) ABSTRACT

Systems and/or methods ("tools") are described that enable indexing and storing verbal content, and other techniques. Some of these tools may be enabled using a computer-implemented method that includes receiving events that result from detecting keywords within a stream. In a first operating mode, the tools may create metadata in response to the event. The metadata includes an indication of the detected keyword and a time index indicating where in the stream the keyword was detected. The tools may also merge the metadata with a portion of the stream where the detected keyword occurred. In a second operating mode, the tools may associate data representing the keyword with the time index, and may store a record that includes the keyword and the time index in an output file.

18 Claims, 5 Drawing Sheets

OTHER PUBLICATIONS

Naphade, et al, "Probabilistic Multimedia Objects (Multijects): A Novel Approach to Video Indexing and Retrieval in Multimedia Systems", Beckman Institute for Advanced Science and Technology, from the Internet: http://www.research.ibm.com/AVSTG/SIMC_JASP.pdf. Oct. 1998.

VanThog et al, "SpeechBot: a Speech Recognition based Audio Indexing System for the Web", Cambridge Research Laboratory, Compaq Computer Corporation, from the Internet: http://gatekeeper.research.compaq.com/pub/DEC/CRL/publications/jmvt/speechbotRIAO2000.pdf. Apr. 2000.

Wold, et al, "Content-Based Classification, Search, and Retrieval of Audio", from the Internet: http://doi.ieeecomputersociety.org/10.1109/93.556537. Sep. 1996.

* cited by examiner

«INDEXING AND STRONG VERBAL CONTENT»

BACKGROUND

Events such as meetings, conferences, presentations, or the like may be recorded and archived, so as to provide permanent records of discussions, interactions, information provided, or decisions made during such events. These recorded events may include audio and/or video content.

The records of these events may be replayed as desired to review or to refresh recollections of what transpired during these events. However, recordings of these events are typically quite large, and consequently may be difficult to search and navigate. In many instances, a reviewer may be reduced to fast-forwarding or rewinding repeatedly through a large recording to locate a given portion of interest.

The time and effort involved in locating a portion of interest in a non-indexed recording of an event may make the bulk recording alone unattractive for use as an archiving and reviewing tool.

SUMMARY

Systems and/or methods ("tools") are described that enable indexing and storing verbal content, and other techniques. Some of these tools may be enabled using a computer-implemented method that includes receiving events that result from detecting keywords within a stream. In a first operating mode, the tools may create metadata in response to the event. The metadata includes an indication of the detected keyword and a time index indicating where in the stream the keyword was detected. The tools may also merge the metadata with a portion of the stream where the detected keyword occurred. In a second operating mode, the tools may associate data representing the keyword with the time index, and may store a record that includes the keyword and the time index in an output file.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

The following document describes system(s) and/or method(s) ("tools") capable of many powerful techniques, which enable, in some embodiments, indexing and storing of verbal content.

Before describing the tools in detail, the following discussions of exemplary operating environments is provided to assist the reader in understanding one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
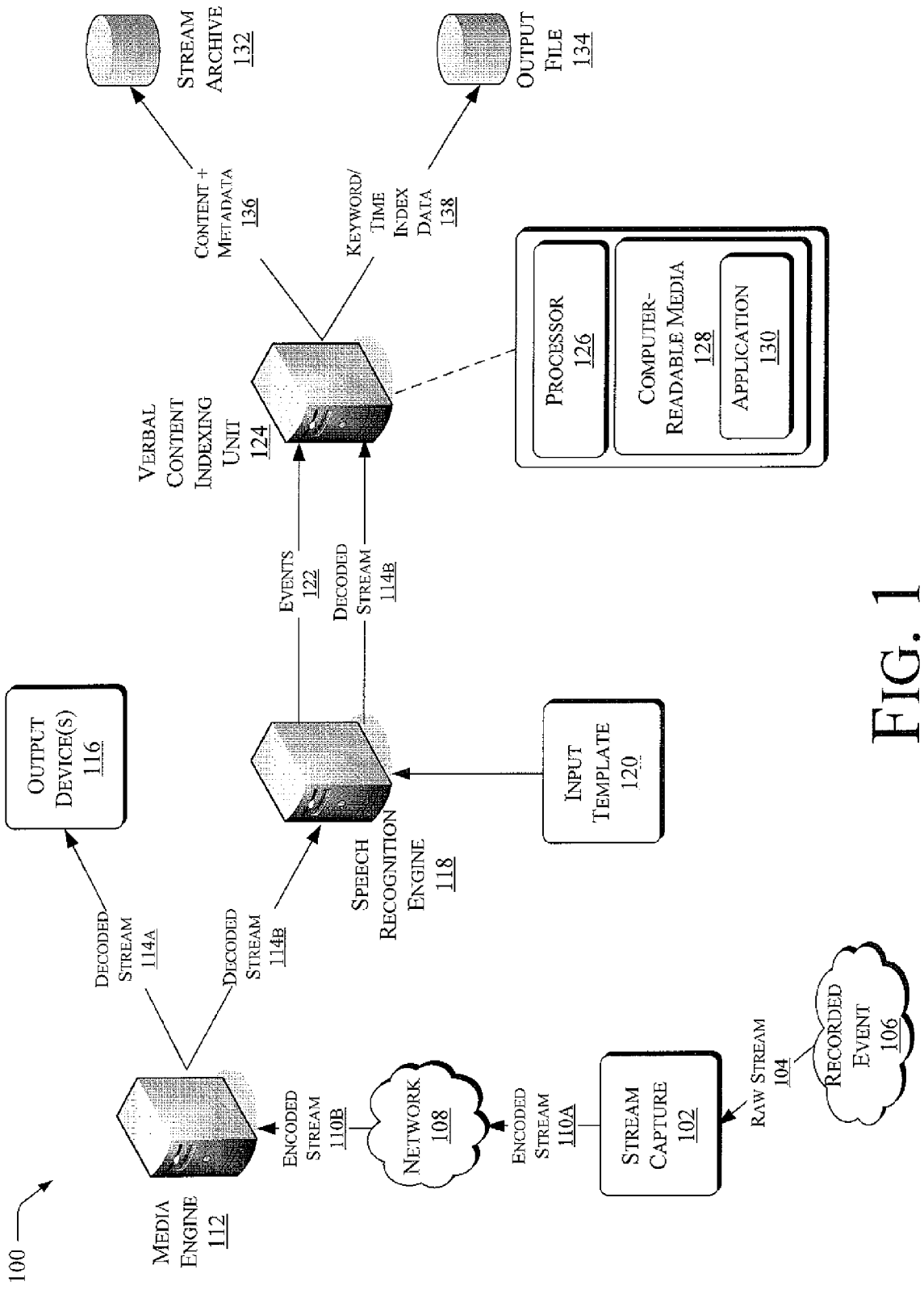
FIG. 1 is a block diagram of an exemplary operating environment in which various embodiments of the description herein may index and store verbal content.

FIG. 1 illustrates one such operating environment, generally at 100, that includes a capture component 102 adapted to capture an audio and/or video stream 104 of an event 106. The capture component 102 may include, but it not limited to, a video camera, microphone, webcam, audio recorder, or any combination of the foregoing. The event 106 may be, for example, a live event such as, but not limited to, a meeting, a conference, a presentation, a sporting event, or the like.

The stream 104 may be transmitted over a network 108 to one or more locations that are remote from where the event 106 is occurring. To facilitate transferring the stream over the network, the capture component 102 (or another component) may encode the stream 104 as appropriate for transmission. Accordingly, the stream 104 may be viewed as a "raw" stream that is converted or encoded into a stream 110 that is suitable for transmission over the network to one or more destinations. For convenience of reference, but not limitation, the stream as it enters the network is referenced at 110A, and the stream as it arrives at a destination from the network is referenced at 110B (collectively, stream 110).

A media engine 112 may receive the encoded 110B and decode it for subsequent processing. For example, the media engine may include a stack or layer for implementing the real-time transfer protocol (RTP) or any other suitable protocols. The media engine may also include components that suppress ambient or background noise captured at the event and included in the stream. Additionally, the media engine may also include components for performing any healing functions on the received stream, such as requesting re-sends of any missing or damaged packets, performing any possible repairs of damaged packets, synchronizing or reordering packets, or the like. Finally, the media engine may include one or more encoder-decoders (codecs) for decoding the encoded stream 110B, and removing any overhead added to the stream 104 for transmission over the network.

The media engine may produce as output one or more decoded streams, referenced generally at 114. For ease of reference only, a stream 114A is shown as routed to one or more output devices 116. The output devices may include video displays or monitors, speakers, televisions sets, or any combination of the foregoing. Viewers and/or listeners may see or hear the stream 114A using the output devices.

A speech recognition engine 118 receives and processes a second stream 114B. It is understood that the streams 114A and 114B may be different instances of the same stream 114, with the speech recognition engine 118 processing the stream 114B in parallel with the rendering of the stream 114A on the output device.

The speech recognition engine may receive as input one or more templates 120, which may specify one or more keywords for which to search in the input stream 114B. In some implementations, the template 120 may be defined manually by, for example, one or more administrators or other users. In other implementations, the template may be defined automatically, based on statistical analysis of the content of the stream 114 (or other streams). The template may also be defined automatically based on a title or other identifier associated with the event 106.

In any event, the speech recognition engine may process the incoming stream 114B to detect occurrences of the keywords specified in the template 120. When one or more keywords are detected, the speech recognition engine may generate an event 122. The event 122 may indicate which particular keyword was detected, and may also indicate where or when the keyword occurred in the incoming stream. For example, each event 122 may be implemented as a record in a data structure, with a record being created for each detection event. The record may include at least a field for data representing the detected keyword, and may also include a field containing a field for data representing a time index that indicates when the detected keyword occurred in the stream.

A verbal content indexing unit 124 may receive the events 122. In some implementations, the verbal content indexing unit 124 may also receive the decoded stream 114B. The verbal content indexing unit is shown separately from the speech recognition engine and the media engine only for ease of description and reference. However, it is understood that, in some implementations, the verbal content indexing unit, the speech recognition engine, and/or the media engine may be integrated. Additionally, in some implementations, the verbal content indexing unit, the speech recognition engine, and the media engine may reside on the same physical machine, while in other implementations, the verbal content indexing unit, the speech recognition engine, and the media engine may reside on separate physical machines.

The verbal content indexing unit may include one or more processors 126 and computer-readable media 128. The processor(s) are capable of accessing and/or executing computer instructions stored on the computer-readable media. The computer-readable media may include one or more applications 130 that embody computer-executable instructions that, when executed, cause a computer-based device or system to perform any of the functions described herein.

The verbal content indexing unit is generally operative to generate and store output in a stream archive 132 and/or an output file 134. In the illustrated but non-limiting implementation shown in FIG. 1, the verbal content indexing unit creates metadata incorporating the events 122, merges this metadata with portions of the stream that correspond to the metadata, and stores the merged metadata and stream data in the stream archive 132. For convenience, the merged metadata and stream data is referenced at 136.

In the foregoing manner, the content stored in the archive includes not only the stream, but also metadata indicating where certain keywords occur in the stream. Recall that the input template 120 may specify these keywords. For example, if the input template specifies to locate occurrences of the keyword "merger", then the metadata may indicate when the word "merger" was spoken during the stream 114B.

It is noted that, in some implementations, the verbal content indexing unit may store the entire stream 114B in the stream archive. In other implementations, only portions of the stream are archived. For example, the verbal content indexing unit may store a portion of the stream that is sufficient to provide context for each occurrence of the specified keywords.

Turning to the output file 134 in more detail, the verbal content indexing unit may be adapted to associate occurrences of the specified keyword with data indicating where the keyword occurred in the stream. The latter may be expressed as a time index, for example. The detected keywords and associated time indices may be organized as a plurality of ordered pairs, such that each keyword occurrence is associated with a time index value. These pairs are referenced generally at 138, and may be stored in the output file 134. Afterwards, the output file may be searched or queried to return all time indices at which a given keyword occurs.

The operating environment 100 may be viewed as a real-time operating environment, in the sense that it may perform speech recognition and/or verbal content indexing on the stream concurrently with receiving the stream and rendering it on the output device 116. Other operating environments that operate in a type of "batch" mode on archived streams are now described with FIG. 2.

Figure 2:
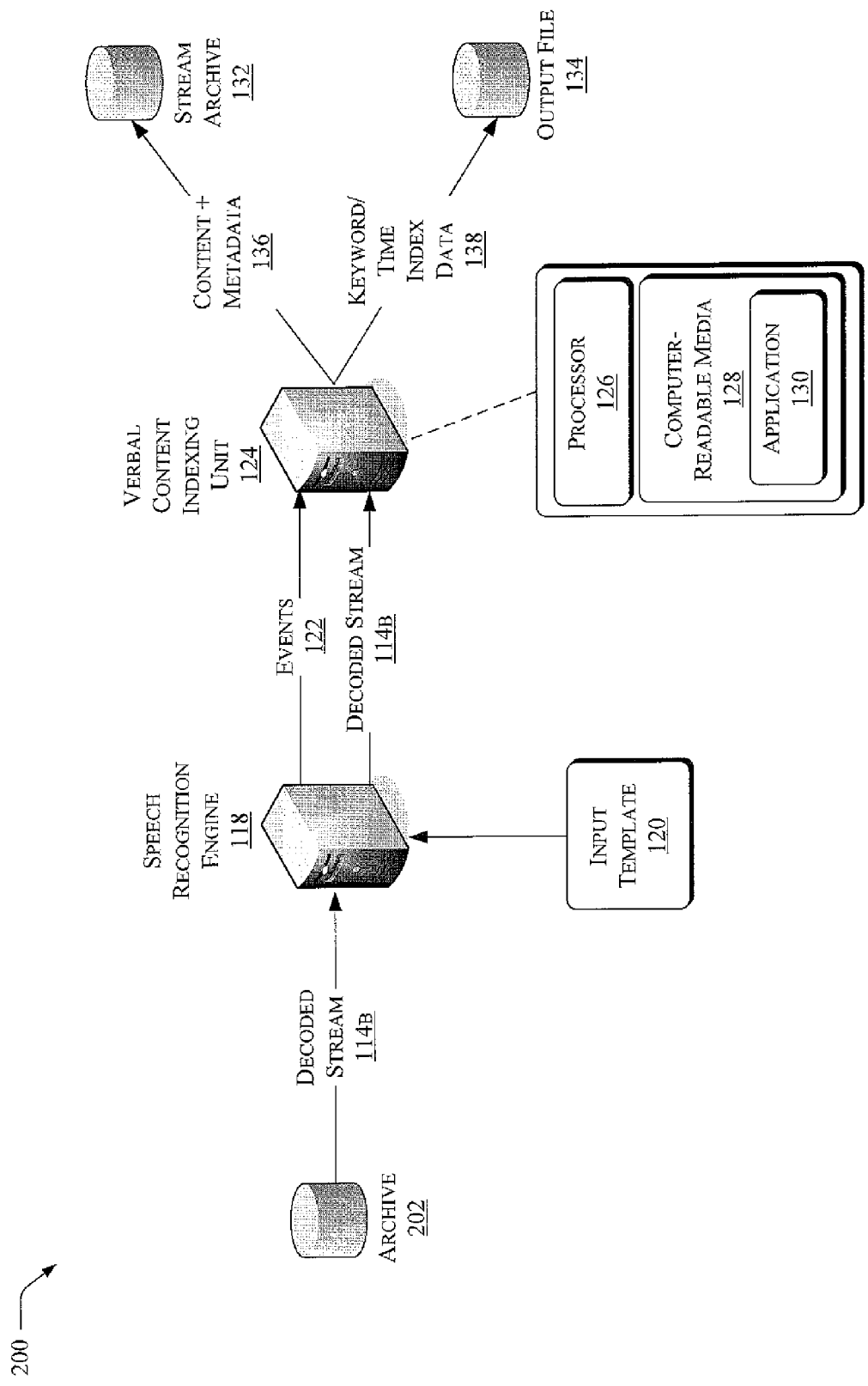
FIG. 2 is a block diagram of another exemplary operating environment in which various further embodiments of the description herein may index and store verbal content.

FIG. 2 illustrates an exemplary operating environment 200 for performing indexing and storage of verbal content. Components that are described above in FIG. 1 are carried forward and referenced by the same reference signs.

While the operating environment 200 shares some components with the operating environment 100, the operating environment 200 processes decoded streams 114B that have been previously stored, rather than content that is streaming in real time. The previously-received decoded streams 114B may be stored in an archive 202. In some implementations, the archive 202 may be the same as the stream archive 132. However, FIG. 2 shows the archive 202 from the stream archive 132 for clarity of description and reference.

The speech recognition engine 118 may read the decoded streams from the archive 202 and process them in a manner similar to that described above in FIG. 1. In summary, the speech recognition engine searches a previously-stored stream for the keywords specified in the template 120, and generates events 122 it detects the specified keywords. The events 122 may include a timestamp, time index value, or other indication of where the keyword was found in the stream.

The verbal content indexing unit 124 may receive and process these events 122. More particularly, the verbal content indexing unit may store these timestamps into a file, such as the output file 134, so that the occurrences of the corresponding keyword may be located readily. Thus, the data stored in the output file 134 may serve as an index or digest for the stream 114B.

The components downstream from the speech recognition engine as shown in FIG. 2 function similarly to the description in FIG. 1 above as well.

The operating environment 200 may be appropriate in instances where the incoming stream cannot be played, processed, and decoded in real time. In such instances, the incoming stream may be stored for later processing in a type of batch mode. The operating environment 200 may, in some implementations, process the previously-stored stream faster than real time.

As above with the operating environment 100, the operating environment 200 may store keyword/timestamp data 138 in the output file 134. Additionally, the operating environment 200 may define metadata for the located keywords and related timestamps, merge the metadata with the stream as data 136, and store the results into the stream archive 132.

Figure 3:
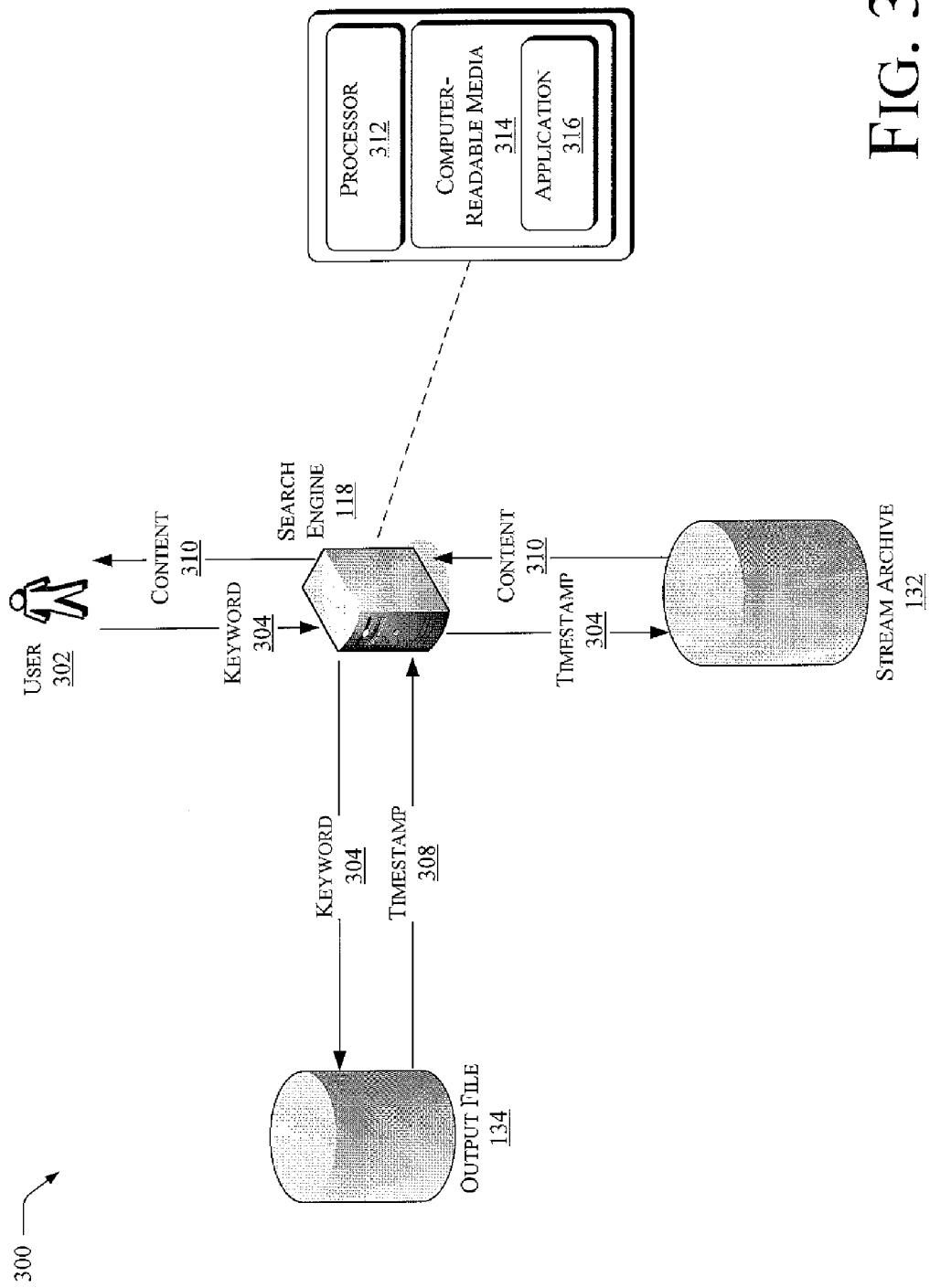
FIG. 3 is a block diagram of components and data flows related to locating occurrences of given keywords in stored representations of streams.

Having described the operating environments shown in FIGS. 1 and 2, the discussion now turns to a description of components and data flows related to locating occurrences of given keywords in stored representations of streams, now presented with FIG. 3.

FIG. 3 illustrates components and data flows 300 related to locating occurrences of given keywords in stored representations of streams. The stream archive 132 and the output file 134 are carried forward from FIGS. 1 and 2. Assume that a user 302 wishes to locate occurrences of one or more keywords 304 in a given stored stream. The user may provide the keyword to a search engine 306.

In turn, the search engine may query the output file 134, using the keyword provided by the user as a search field or key. Recall from above that the output file is constructed to provide an index or digest of the stream. The output file may then return timestamp data 308 that indicates where in the stream the requested keywords occurred.

Given this timestamp data 308, the search engine may query the stream archive 132 for stream content 310 that corresponds approximately to the locations indicated by the timestamp data. The steam content 310 contains the portion of the stream where the keyword 304 occurred.

It is noted that the stream archive 132 may return stream content 310 that provides appropriate context for the occurrence of the keyword. For example, if a speaker uttered the word "merger" several times, and the sought keyword 304 is "merger", then the content 310 may return not only the spoken word "merger" but also some portion of the discussion occurring before and/or after the spoken word "merger". Given this information, the user 302 may traverse the stream content stored in the stream archive to explore further context for each occurrence of the "merger".

The stream archive 132 and the output file 134 are represented herein as separate entities only for convenience of reference and description. However, it is understood that this representation does not limit possible implementations of the description herein. For example, the stream archive 132 and the output file 134 may be combined or integrated into one data store, or may be maintained as separate data stores.

As shown in FIG. 3, the search engine 306 may include one or more processors 312, one or more computer-readable media 314, and one or more applications 316. These processors, computer-readable media, and applications are similar to the processors 126, computer-readable media 128, and applications 130 shown in FIGS. 1 and 2 and described above. However, FIG. 3 references separate processors, computer-readable media, and applications to indicate an association with the search engine, rather than the verbal content indexing unit.

Figure 4:
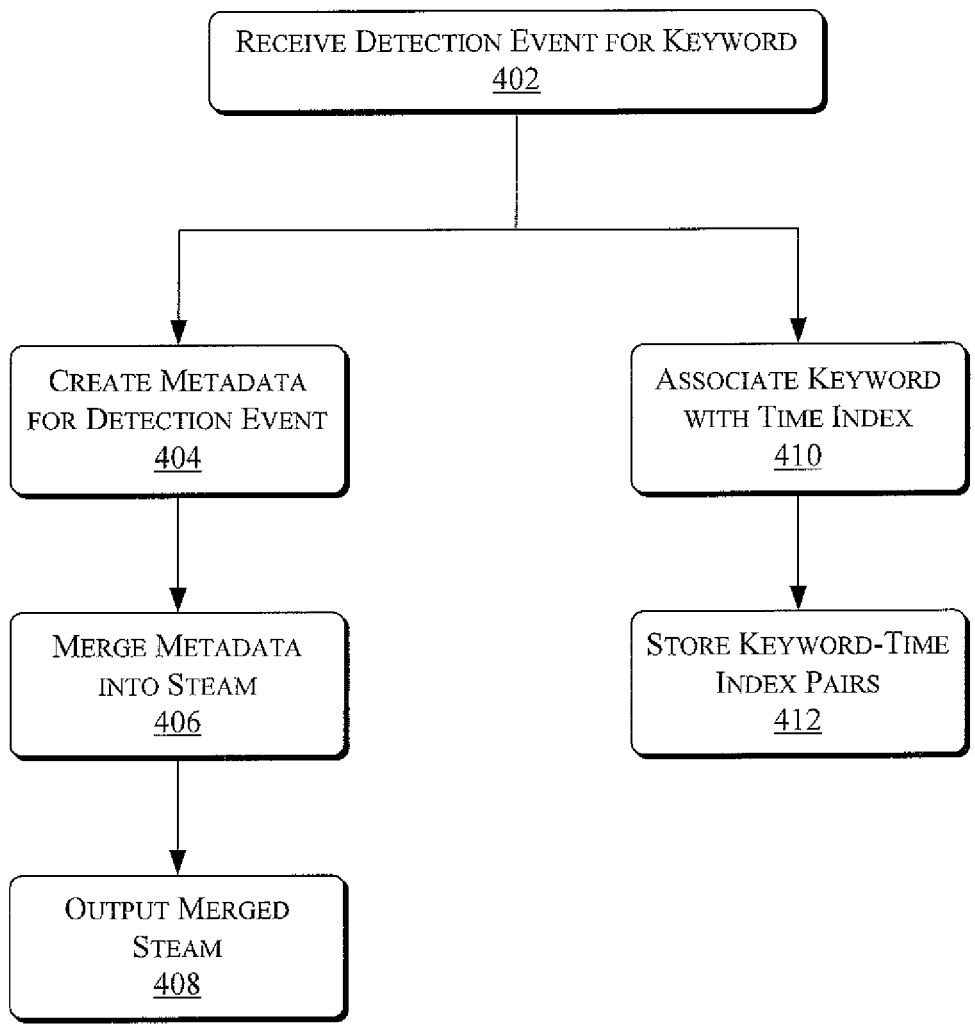
FIG. 4 is a flow diagram of an illustrative process flow for indexing and storing verbal content.

FIG. 4 illustrates a process flow 400 for indexing and storing verbal content. The process flow 400 may be performed, for example, by a verbal content indexing unit, such as the unit 124 shown in FIG. 1 and described herein. However, it is noted that the process flow 400 may be performed, in whole or in part, by other components and in other systems without departing from the scope and spirit of the description herein.

Action block 402 represents receiving a detection event from, for example, a speech recognition engine. An example speech recognition engine is shown in FIG. 1 at 118, and an example event is shown at 122. The event indicates that at least one specified keyword has been detected or located in a stream.

Action block 404 represents creating metadata based on the detection event received in block 402. As described above, the metadata can include at least the keyword that was detected, and a timestamp, time index, or other indication of where the keyword occurred in the stream.

Action block 406 represents merging or associating the metadata, created in block 404, with the stream. More particularly, the metadata may be associated with the portion of the stream where the keyword occurred.

Action block 408 represents outputting the merged stream. In different implementations, the merged stream may be rendered and presented to one or more viewers and/or listeners, or the merged stream may be archived for later reference. For example, block 408 may include storing the stream and related metadata in a stream archive (e.g., the stream archive 132) and/or an output file (e.g., the output file 134).

Action block 410 represents associating the detected keyword with a time index. For example, block 410 may include entering data representing the keyword and the time index into respective fields in a record created for the event received in block 402.

Action block 412 represents storing the keyword-time index pairs or groups for later reference. For example, the keyword-time index pairs may be stored in an output file, such as the output file 134. In some implementations, the keyword-time index pairs may be made available for later processing by a search engine, such as the search engine 306 shown in FIG. 3.

It is noted that blocks 404-408 may represent one possible execution path through the process flow 400 that is chosen in response to selection of a first operating mode of, for example, a verbal content indexing unit. It is further noted that blocks 410-412 may represent another possible execution path through the process flow that is chosen in response to selection of another operating mode of the verbal content indexing unit.

Figure 5:
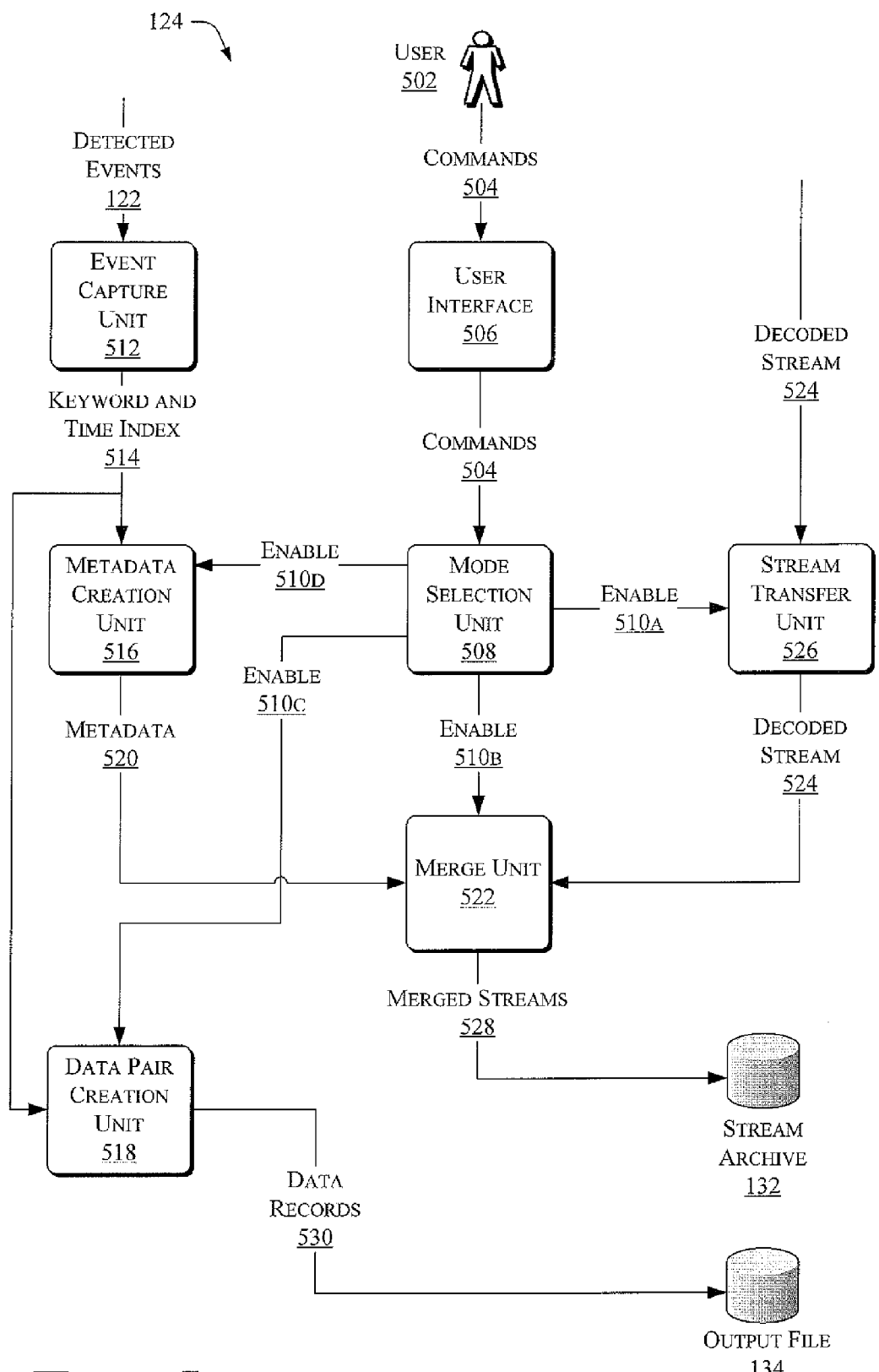
FIG. 5 is a block diagram illustrating various components of a verbal content indexing unit, as shown in FIGS. 1 and 2.

Having described the above process flow for indexing and storing verbal content, the discussion now turns to a description of illustrative implementations of the verbal content indexing unit, now presented in connection with FIG. 5.

FIG. 5 illustrates various components of the verbal content indexing unit 124, as shown in FIGS. 1 and 2. The components shown in FIG. 5 may be implemented using any combination of hardware and software, as appropriate in different implementations. Additionally, it is understood that some implementations of the verbal content indexing unit may include fewer than all of the components shown in FIG. 5, and that other implementations may include components other than those shown in FIG. 5.

The verbal content indexing unit 124 may be operable in a number of different modes, in response to commands received from an administrator or other user 502. For example, as described above, the verbal content indexing unit may merge metadata with the stream, and store one or both in a stream archive and/or an output file. In another mode, the verbal content indexing unit may store pairs of keywords-time indices in an output file. Other modes may be implemented as well. An example of the stream archive is shown in FIG. 1 at 132, and an example of the output file is shown in FIG. 1 at 134.

The administrator may issue commands 504 via a user interface 506. These commands 504 may include commands indicating a mode in which the verbal content indexing unit is to operate. For example, the administrator may choose any of the modes described above (e.g., merge metadata with the stream and archive, store pairs of keywords-time indices, etc.) via an appropriate command.

A mode selection unit 508 may receive these commands, and in response thereto, enable or disable various other components shown in FIG. 5. The mode selection unit may drive enable/disable signals or lines 510A, 510B, 510C, and 510D (collectively enable/disable signals or lines 510). The functions of these various lines are explained further below in connection with the components enabled/disabled by these lines.

As shown in FIG. 5, the verbal content indexing unit may include an event capture unit 512 that receives notifications of events from, for example, a speech recognition engine. An example of the events is referenced at 122 in FIG. 1, and the above description of these events 122 applies equally to FIG. 5. Generally, an event corresponds to detection of a keyword at a given time index in an audio and/or video stream.

The event capture unit 512 may be operative to extract data from the event notifications. For example, the event capture unit may extract at least the keyword whose detection gave rise to the event, as well as the time index in the stream where the keyword was detected. This extracted data is referenced at 514, and may be provided to a metadata creation unit 516 and a data pair creation unit 518.

The metadata creation unit 516 may create metadata 520 for each keyword whose detection results in the detected events 122. The metadata creation unit may operate when activated by the enable signal 510D. In turn, the enable signal 510D may be enabled or disabled by the mode selection unit, in response to the commands from the administrator.

A merge unit 522 may receive the metadata 520 and merge it with corresponding portions of a stream 524. The stream is sent to the merge unit through a stream transfer unit 526. The stream transfer unit may pass the stream 524 through when activated by the enable signal 510A. In turn, the enable signal 510A may be enabled or disabled by the mode selection unit, in response to the commands from the administrator.

The merge unit generates merged streams 528 and stores these streams in, for example, the stream archive 132. The merge unit may operate when activated by the enable signal 510B. In turn, the enable signal 510B may be enabled or disabled by the mode selection unit, in response to the commands from the administrator.

The data pair creation unit 508 receives the extracted data 514, which contains the keyword and time index information. The data pair creation unit also associates occurrences of detected keywords with corresponding time index information, which indicates where the keyword was detected in the stream. For example, the data pair creation unit may populate fields of a record with respective data representing a detected keyword and corresponding time index information. A respective record 530 may be created for each event 122 received by the event capture unit 512. The data pair creation unit may store these records 530 into an output file, such as the output file 134, for later retrieval and reference.

The data pair creation unit may operate when activated by the enable signal 510C. In turn, the enable signal 510C may be enabled or disabled by the mode selection unit, in response to the commands from the administrator.

CONCLUSION

The above-described systems and methods enable indexing and storing of verbal content. These and other techniques described herein may provide significant improvements over the current state of the art, potentially providing greater and faster locating of specific keyword occurrences within archives of recorded events. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the subject matter claimed herein.

What is claimed is:

1. A verbal content indexing unit, comprising:
   an event capture unit for receiving at least one event resulting from detection of at least one keyword in a stream and for extracting data from the at least one event, wherein the data from the at least one event representing the at least one keyword and a time index indicating when in the stream the at least one keyword was detected;
   a metadata creation unit for creating metadata based on the data from the at least one event;
   a merge unit for merging the metadata with at least a portion of the stream at the time index the at least one keyword was detected, the merge unit further configured for storing the metadata with the at least a portion of the stream in a stream archive; and
   a data pair creation unit for creating at least one data record comprising at least the data from the at least one event representing the at least one keyword and the time index indicating when in the stream the at least one keyword was detected.

2. The verbal content indexing unit of claim 1, further comprising respective enable lines for activating the metadata creation unit, the merge unit, and the data pair creation unit.

3. The verbal content indexing unit of claim 2, further comprising a mode selection unit for driving the respective enable lines.

4. The verbal content indexing unit of claim 1, further comprising a stream transfer unit for receiving the stream and passing the stream through to the merge unit.

5. The verbal content indexing unit of claim 4, further comprising an enable line for activating the stream transfer unit.

6. The verbal content indexing unit of claim 1, wherein the data pair creation unit stores the at least one data record in an output file.

7. The verbal content indexing unit of claim 1, wherein the verbal content indexing unit receives events from a separated speech recognition engine.

8. The verbal content indexing unit of claim 1, wherein the verbal content indexing unit receives events from an integrated speech recognition engine.

9. The verbal content indexing unit of claim 1, wherein the event capture unit receives events processed from a live stream.

10. The verbal content indexing unit of claim 1, wherein the event capture unit receives events processed from a previously-recorded stream.

11. A computer-implemented method, comprising:
    receiving at least one event resulting from detection of at least one keyword in a stream;
    selecting a first operating mode of the method;
       creating metadata in response to the at least one event, wherein the metadata comprises at least an indication of the at least one keyword and a time index indicating when in the stream the at least one keyword was detected; and
       merging the metadata with at least a portion of the stream where the at least one keyword was detected; and
    selecting a second operating mode of the method;
       associating data representing the at least one keyword with the time index indicating when in the stream the at least one keyword was detected;

creating at least record comprising the at least one keyword and the time index;
storing the at least one record; and
archiving the stream as merged with the metadata into a stream archive.

12. The computer-implemented method of claim 11, wherein the receiving of the at least one event comprises receiving an event resulting from detection of a spoken keyword in an audio stream.

13. The computer-implemented method of claim 11, wherein the receiving of the at least one event comprises receiving the event from a speech recognition engine.

14. A verbal content indexing unit for performing the method of claim 11.

15. The computer-implemented method of claim 11, further comprising operating on an output file comprising the at least one record with a search engine.

16. The computer-implemented method of claim 15, wherein the search engine further receives a keyword from a user, queries the output file using the keyword, and obtains from the output file at least one time index value indicating when in the stream the keyword occurred.

17. The computer-implemented method of claim 16, wherein the search engine further queries a stream archive using the at least one time index value, and obtains a portion of the stream containing content corresponding to the at least one time index value.

18. The computer-implemented method of claim 17, wherein the search engine further configured obtains context for the portion of the stream containing content corresponding to the at least one time index value.

* * * * *

UNITED STATES PATENT AND TRADEMARK OFFICE
CERTIFICATE OF CORRECTION

PATENT NO. : 7,668,721 B2  Page 1 of 1
APPLICATION NO. : 11/419678
DATED : February 23, 2010
INVENTOR(S) : Warren V Barkley et al.

It is certified that error appears in the above-identified patent and that said Letters Patent is hereby corrected as shown below:

On the Title Page, change Title and

Column 1, line 54, change "Indexing and Strong Verbal Content"

to -- Indexing and Storing Verbal Content --.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,668,721 B2 Page 1 of 1
APPLICATION NO. : 11/419678
DATED : February 23, 2010
INVENTOR(S) : Warren V Barkley et al.

It is certified that error appears in the above-identified patent and that said Letters Patent is hereby corrected as shown below:

On the Title Page, Item (54) and at Column 1, lines 1 and 2, change Title "Indexing and Strong Verbal Content" to -- Indexing and Storing Verbal Content --.

This certificate supersedes the Certificate of Correction issued April 6, 2010.

Signed and Sealed this

Twenty-seventh Day of April, 2010

David J. Kappos
*Director of the United States Patent and Trademark Office*